(12) United States Patent
Wuerstl

(10) Patent No.: US 8,973,991 B2
(45) Date of Patent: Mar. 10, 2015

(54) SEAT ANCHORING ELEMENT FOR CHILD SAFETY SEATS OR BABY CARRIERS

(75) Inventor: Jan-Stefan Wuerstl, Regnitzlosau (DE)

(73) Assignee: Curt Wuerstl Vermoegensverwaltungs-GmbH & Co. KG, Hof (DE)

( * ) Notice: Subject to any disclaimer, the term of this patent is extended or adjusted under 35 U.S.C. 154(b) by 139 days.

(21) Appl. No.: 13/812,202

(22) PCT Filed: Oct. 5, 2011

(86) PCT No.: PCT/EP2011/067374
§ 371 (c)(1),
(2), (4) Date: Jan. 25, 2013

(87) PCT Pub. No.: WO2012/049048
PCT Pub. Date: Apr. 19, 2012

(65) Prior Publication Data
US 2013/0119732 A1 May 16, 2013

(30) Foreign Application Priority Data
Oct. 13, 2010 (DE) ...................... 20 2010 008 803 U

(51) Int. Cl.
*B60N 2/28* (2006.01)
(52) U.S. Cl.
CPC ............ *B60N 2/2887* (2013.01); *B60N 2/2806* (2013.01); *B60N 2/2821* (2013.01)
USPC ......................................... 297/253
(58) Field of Classification Search
CPC .... B60N 2/286; B60N 2/2898; B60N 2/2821; B60N 2/2887; B60N 2/2806
USPC ................... 297/250.1, 253, 256.16
See application file for complete search history.

(56) References Cited

U.S. PATENT DOCUMENTS

| | | | |
|---|---|---|---|
| 7,364,213 B2 | 4/2008 | Romolo | |
| 8,141,950 B2* | 3/2012 | Boyer | 297/250.1 |
| 2009/0066131 A1* | 3/2009 | Hendry | 297/256.16 |
| 2010/0033001 A1 | 2/2010 | Boyer | |

(Continued)

FOREIGN PATENT DOCUMENTS

| | | |
|---|---|---|
| DE | 298 12 471 U1 | 10/1998 |
| DE | 202 11 937 U1 | 10/2002 |

(Continued)

OTHER PUBLICATIONS

International Search Report of PCT/EP2011/067374, Jan. 4, 2012.

*Primary Examiner* — Milton Nelson, Jr.
(74) *Attorney, Agent, or Firm* — Collard & Roe, P.C.

(57) ABSTRACT

A seat anchoring element for child safety seats or baby carriers has an anchoring element which can be secured to fixation elements on the vehicle seat, or to the vehicle body, by connectors at the ends of a separate strap system. The seat anchoring element comprises at least one front and rear securing element on the upper face for fixing the child safety seat or the baby carrier thereto, and least one tensioning device for those parts at the ends of which the connectors are located. The straps of the strap system can be wound onto a ratchet spool of the tensioning device and can be unwound after a locking mechanism of the ratchet is unlocked. A lever mounted pivotably with the seat anchoring element is coupled with the ratchet, wherein the bearing axis of the lever runs transversely to the longitudinal axis of the seat anchoring element.

16 Claims, 2 Drawing Sheets

(56) References Cited

U.S. PATENT DOCUMENTS

Figure 3:
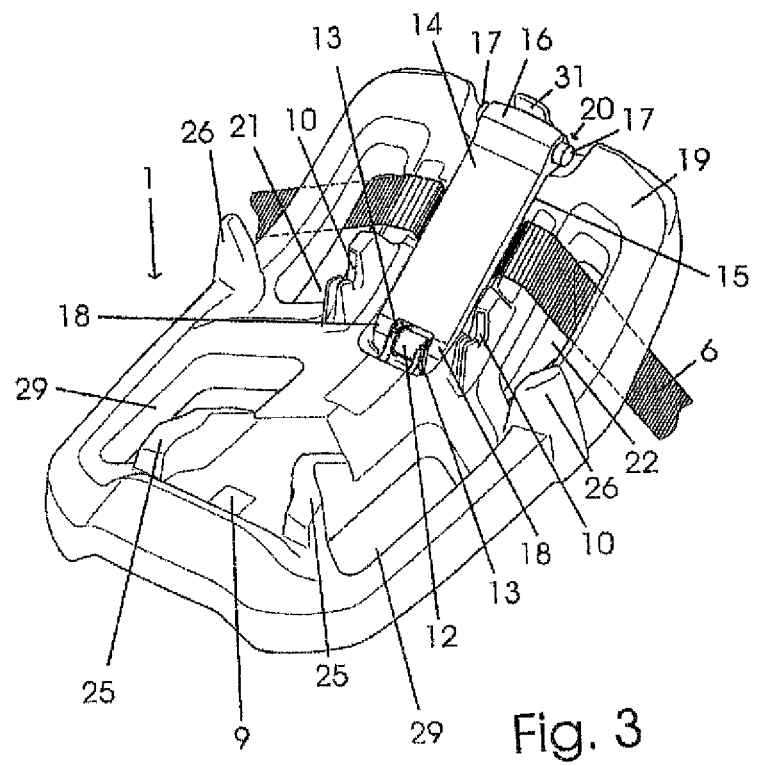

| | | | |
|---|---|---|---|
| 2010/0253121 A1* | 10/2010 | Buckingham et al. | 297/253 |
| 2011/0089726 A1 | 4/2011 | Gibree | |
| 2012/0007398 A1* | 1/2012 | Fritz et al. | 297/253 |

FOREIGN PATENT DOCUMENTS

| | | |
|---|---|---|
| DE | 20 2009 001 975 | 5/2009 |
| DE | 10 2009 043 506 | 9/2010 |
| EP | 0 485 121 | 5/1992 |
| EP | 560184 A1 * | 9/1993 |
| EP | 0 822 115 | 2/1998 |
| EP | 0 967 113 | 12/1999 |
| EP | 1 197 378 | 4/2002 |
| EP | 1 369 294 | 12/2003 |
| EP | 1 470 952 | 10/2004 |
| EP | 1 477 356 | 11/2004 |
| EP | 1 591 307 | 11/2005 |
| EP | 1 369 293 | 7/2006 |
| EP | 1 714 826 | 10/2006 |
| WO | WO 2004/002773 | 1/2004 |
| WO | WO 2005/108155 | 11/2005 |
| WO | WO 2007/101212 | 9/2007 |

* cited by examiner

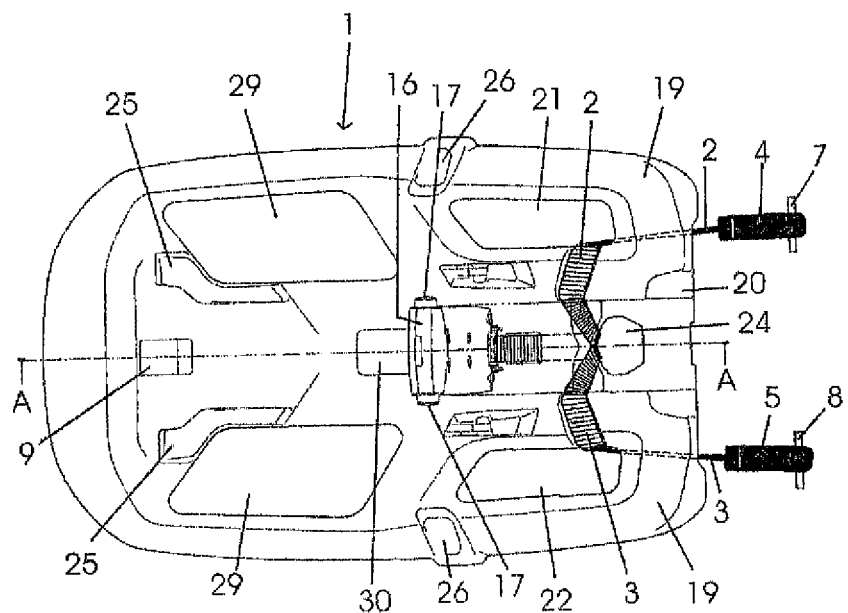
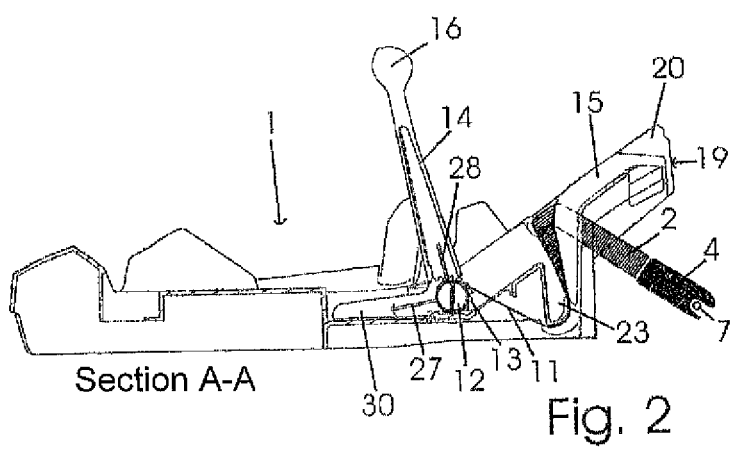
Fig. 1
Fig. 2
Section A-A

SEAT ANCHORING ELEMENT FOR CHILD SAFETY SEATS OR BABY CARRIERS

CROSS REFERENCE TO RELATED APPLICATIONS

This application is the National Stage of PCT/EP2011/067374 filed on Oct. 5, 2011, which claims priority under 35 U.S.C. §119 of German Application No. 20 2010 008 803.8 filed on Oct. 13, 2010, the disclosures of which are incorporated by reference. The international application under PCT article 21(2) was not published in English.

The invention relates to a seat anchoring element for child safety seats or baby carriers on a vehicle seat with the features indicated in the preamble of claim 1.

A seat anchoring element of the categorising kind is known from EP 1 591 307 A2 and from WO 2007/101212. The seat anchoring element can be constructed in various ways. It serves as an installation securing element for a baby carrier or a child safety seat on a vehicle seat. Some of these seat anchoring elements can also have guide rails for adjustment of angle of inclination of a detachable child safety seat. These seat anchoring elements have in common, at the rear side, either rigid so-called ISOFIX connectors for coupling to fixing elements mounted according to standard, namely transverse pins in the cushion of the back wall or in the intermediate space between the seat and the backrest of the vehicle seat, or lateral belts with connectors for fastening to such fixing elements.

In one form of embodiment according to WO 2007/101212 the seat anchoring element has lateral, rearwardly accessible belts which are fastened within the seat anchoring element to a tensioning belt. These belts have, at the end, connectors for fastening to the fixing elements—the ISOFIX anchors—at the vehicle seat. The common tensioning belt can be wound up on a reeling device actuable by a laterally protruding handwheel. This reeling device comprises a ratchet, the locking mechanism of which is effective during reeling up and is releasable by withdrawing a pawl through drawing forward the actuating wheel in order to be able to further withdraw the reeled-up belt section so as to be able to produce a greater spacing of the vehicle seat from the backrest of the vehicle's own seat.

In all forms of embodiment the two belts can be drawn up rearwardly from the rear wall of the seat anchoring element. The Lateral belts and also the common tensioning belt to which these are, for example, sewn are in that case so deflected within the wall that through tightening the protruding tensioning belt end accessible from the upper side of the wall the two lateral belts can be tensioned. A provided retraction securing device clamps the tensioning belt and can be actuated by a finger for release.

It is additionally known to fasten a seat anchoring element by means of a transverse belt to a vehicle's own seat. For that purpose the transverse belt is drawn through lateral openings of the seat anchoring element in the rear support region on the vehicle seat and, in particular, through openings or gaps so that the transverse belt rests on the inner surface of the seat anchoring element. The two lateral connectors or lock tongues mounted on the transverse belt can be connected with the corresponding counter-connecting elements at the seat or between seat part and backrest of the vehicle seat.

In the case of fastenings by means of belt systems there is the disadvantage that placing of the seat anchoring element at the seat surface and with the rear side of the wall against the backrest of the vehicle's own seat cannot be effected under tension. In fact, to a certain extent tension can be achieved by way of a setting wheel which is connected with a ratchet drum on which the tensioning belt is reeled up, but the torque is dependent on the user. The laterally protruding control wheel can thus also be displaced in the opposite direction or, however, also erroneously in axial direction, whereby unlocking of the ratchet is actuated so the belt then diminishes in tension in unintended mode and manner.

Fastenings by means of telescopically extendable connectors (ISOFIX connecting system) are also known from, for example, DE 298 12 471 U1. The seat anchoring elements are known in various forms from WO 2004/002773 A1, EP 0 485 121 A, EP 0 822 115 A, WO2005/108155A, EP 1 197 378 A, EP 0 967 113A, EP 1 369 294 A1, EP 1 470 952 A1, EP 1 714 826 A1, EP 1 369 293 B1 and EP 1 477 356 A1. Child seats consisting of a seat part and a backrest part or alternatively also baby carriers, namely shell lying-down seats for small children in the first months of life, are placed—in part also exchangeably—on seat anchoring elements of that kind and held secured thereto by locking means.

The present invention has the object of developing a seat anchoring element of the categorising kind so that the belts can be tensioned in simple manner by a low expenditure of force to enable secure retention, for example at ISOFIX anchors present at the vehicle seat as fixing elements, wherein the actuating element of such a tensioning device should be not visible and accessible when the baby carrier is in place and/or the fastening rods of an ISOFIX connecting system can be drawn into the seat anchoring element by the same means. In a further embodiment it is to be provided that alternatively to the use of own belt systems for fastening by way of connectors use can also be made of transverse belts, for example in order to be able to also use the baby carrier or the child safety seat in conjunction with a vehicle seat, which does not have ISOFIX anchors or fixing elements, in order to be able to fasten the connectors or lock systems thereto.

The invention fulfils the object by the design of the seat anchoring element indicated in claim 1.

The invention provides that the belts of the belt system or belts connected with the rods or a common tensioning belt connected with the individual belts can be wound up on a ratchet drum of the tensioning device and after unlocking of blocking means of the ratchet at least partly unwound, which ratchet drum is rotatably mounted in the seat anchoring element, and that coupled with the ratchet is a lever which is pivotably mounted in the seat anchoring element and which is pivotable into a recess in the seat anchoring element from the upright ratchet-actuating setting for tensioning the belts or the tensioning belt to a recessed rest setting, wherein at least the axis of the pivot extends transversely to the longitudinal axis of the seat anchoring element.

Tensioning devices with a ratchet drum which for tensioning the belt can be rotated in steps by means of a lever with an entrainer mounted thereon—which is displaceable against the force of a spring and which drops into the tooth gaps in one movement direction of the lever and rotates the ratchet in the other movement direction—are known in the most diverse forms of construction and are usually used at tensioning belts for securing freight to a transport vehicle. The ratchet drum is mounted in a U-shaped carrier, to which is fastened a belt having at the other end a hook and an eye for fixing to a fastening point. An insertion gap into which the tensioning belt is pushed is disposed in the ratchet drum. Through actuation of the lever the drum is rotated in steps by way of the entrainer and reeled up. For that purpose, disposed on either side of the ratchet drum are ratchets in the form of gear rims with sawtooth-shaped teeth in which the entrainer engages. In addition, a spring-loaded latch is displaceably mounted on the U-shaped carrier, which latch automatically engages in the tooth gaps during ratcheting and ensures mechanically positive blocking on both sides. This latch can be manually displaced against the force of the spring so as to be able to unwind the reeled-up tensioning belt again from the ratchet drum.

Tensioning devices with a ratchet drum in different constructional forms are known from, for example, DE 10 2009 043 506 A1 and DE 202 11 937 U1, which can be used here in the indicated forms of construction or in a described simplified construction, wherein the U-shaped carrier with the lateral mounting points for the ratchet drum is fastened in plan view on the base of the seat anchoring element. This can be carried out, for example, by riveting or by screw connections.

The position of the ratchet axis can, in principle, be freely selected if the tensioning belt is appropriately guided in mounting slots and in passages of the walls of the seat anchoring element. It is also possible to provide two ratchet drums, thus for each of the individual belts, on which these can be wound up and separately tensioned. The lateral belts are provided with connectors. The individual ratchet drums are mounted on the base wall of the seat anchoring element.

It is also possible to fasten these in a row and, in particular, with an axis extending transversely to the longitudinal axis of the seat anchoring element and to operate these by way of a common lever. The lever can also be pivotably arranged separately from the axis of rotation of the ratchet drum. In this case, however, the entrainer and the blocking means have to be constructed so that these are functionally operable to transform the pivot movement into a rotational movement of the ratchet drum. According to the invention the axis of the pivot of the lever shall always be arranged transversely to the longitudinal axis of the seat anchoring element, which has the advantage that the rearward wall can be provided with a continuous recess into which the lever can be pivoted and thus recessed when being brought into the rest setting.

A known baby carrier or a child seat can thus be placed on such a seat anchoring element and fixed to the fastening points provided there without special adaptations of the constructional arrangement of the seat anchoring element having to be undertaken. The arrangement has, in addition, the advantage that the lever can also be constructed to be relatively long so that the ratchet is operable in simple manner with little force. In addition, the rear wall of the seat anchoring element can be used for embedding the lever over the entire length and the lever can be constructed to be relatively flat. The U-shaped recess has to be correspondingly shaped. If, in addition, the lever has a handle at the top side then a corresponding recess has to be provided in the rear wall of the seat anchoring element so that the handle can be gripped from behind by fingers in order to be able to operate it during fastening of the seat anchoring element on the vehicle seat.

In order that the lever is securely anchored in the recess in the rest setting a locking device is additionally provided. This can, in principle, be mounted at any point on the length of the lever. However, it is particularly advantageous if the locking device is disposed in the region of the handle, thus at the upper end of the lever. The locking device can, as usual in the case of lever locking, consist of a latch, a detent lug or a locking pin, which is mounted at the lever or at a wall of the recess and with which corresponding counter-elements at the other part co-operate. If, for example a locking pin is provided, then this can be provided, for example, at the upper side at the handle to protrude and can engage in a recess or behind a lug of a spring element, which is fastened to the rear wall of the seat anchoring element. The spring element can also have a receptacle in which the pin detents and is held secured by a flange. For release of detenting, the lever has to be pressed down by the extent of the flange in order to be able to pivot the spring element to such an extent that it can be withdrawn beyond the flange from the pin and release this. In addition, detent lugs can be provided to protrude into the recess, which lugs can pivot and on pivotation-in of the lever engage behind blocking edges and be manually pivoted back by means of an actuating mechanism so as to enable release of the lever. Thus, many design possibilities of the locking device of known kind are possible. It is necessary to provide at one of the two parts, thus at the lever or at the wall, special actuating elements which co-operate with an unlocking mechanism so that the locking device can be unlocked in order to be able to bring the lever into a ratchet actuating setting from the rest setting, so that by reciprocating movement the ratchet is ratcheted each time through the over-travelled tooth sequence or through individual divisions.

The lever arrangement has the advantage that this not only is usable for ratchet actuation, but also can be used for fixing the seat anchoring element to a vehicle seat by means of a transverse belt if, for example, no ISOFIX anchors in the seat, thus no fixing elements in the form of transverse bolts, are available, but, for example, only the lap belt section of a three-point belt or a separate transverse belt. The transverse belt has, for example, lock tongues so as to enable fastening to the locks of the vehicle seat, these locks being provided for the lock tongues of the three-point safety belt at the vehicle seat. In that case it will be obvious that the length of the transverse belt has to be appropriately matched to the fastening points, for which purpose such transverse belts are lengthenable and shortenable and have lock tongues at both ends so as to be able to be inserted into the plug locks. If such a transverse belt is laid transversely over the recess, then the transverse belt on pivotation of the lever into the recess is drawn in and laterally deflected, so that an additional lateral retention with simultaneous tensioning of the transverse belt is provided. The different fastenings are virtually equivalent, although now a connection with the fixing point elements of the seat takes place by way of lateral individual belts—which are led out at the rear side—with connectors or a fastening to existing lock systems takes place by way of a transverse belt.

The seat anchoring element can obviously also have additional telescopic rearwardly extendable fastening rods with connectors so that fastening to fixing elements at the seat, namely the ISOFIX anchors, can be carried out by way of these as well. This always presupposes, however, that these are mounted at a spacing from one another to such an extent that the two connectors can be mounted. The solution with the belts, thereagainst, also allows fastening when the ISOFIX anchors are at a greater or closer spacing relative to one another. The inventive solution, namely the use of a ratchet for fastening the seat anchoring element to the vehicle seat, is also usable in connection with ISOFIX anchoring systems when the connectors are fastened to rods, which are movable in guides of the seat anchoring element and can be drawn into these. For the tightening—thus tensioning—the connection, belts can be fastened to the rods and either wound up on separate ratchet drums or fastened to a common tensioning belt which can be wound up on a single ratchet drum. In that case it will be obvious that the belts have to be deflected so that the desired tension force is exerted when the rods are tightened. However, provision can alternatively also be made for the two rods to be connected together by way of a bridge element and for a tensioning belt, which is tensionable by way of the ratchet in desired manner, to be fastened to this bridge element.

In principle, the invention can thus also be used on seat anchoring elements designed in that manner. It is not confined to a special constructional form of the seat anchoring element.

In order to enable simple operation of the lever when releasing the locking, two laterally protruding actuating elements can be provided in the handle, which elements are mounted to be displaceable against the force of a spring arrangement and act on a locking mechanism, which fixes the detent lug, the latch or the pin. The seat anchoring element can also, for easier access to the lever, have at the rear side an elevated wall which extends at an inclination and which is supported on the backrest of the vehicle. The recess is then formed centrally in this wall to extend at an inclination from below to above and rearwardly, into which recess the lever coupled to the ratchet in the foot region of the inclination can be pivoted. In order to achieve a compact mode of construction the lever can have mounting limbs at both sides, which engage over the ratchet drum so that the lever can be arranged on the same axis and is adjustable relative to the ratchet drum, in which case the entrainer engages in the ratchet for forward rotation. The blocking means takes over the previously described spring-loaded latch. The entrainer obviously also has to be resiliently mounted, since on pivotation of the ratchet lever it initially has to automatically slide over the tooth flanks. The entrainers are connected together by way of a bridge element so that on release of the ratchet they can be moved out of the toothings.

The lateral belts protruding rearwardly are guided through passages and deflections formed in the rear wall of the seat anchoring element. They can be sewn to a tensioning belt, which, as a central belt, can be reeled up on the ratchet drum. In the case of individual construction, two ratchet drums are to be provided. After connection of the connectors with the fixing elements at the vehicle seat the belts can then be tensioned by way of the central tensioning belt by means of the tensioning device with the ratchet and the lever, wherein the seat anchoring element is pressed not only against the backrest of the vehicle seat, but also onto the seat portion of the vehicle seat and bears here under stress so that a secure retention is provided. In order to be able to better guide and deflect a transverse belt, provision can additionally be made for lateral passages, through which the transverse belt or the lap belt section of the vehicle's own safety belt can be drawn in wave form, to be provided parallelly to the centre wall section of the wall of the seat anchoring element at which the lever is fastened and mounted. Thus, additionally to the clamping deflection in the region of the recess in which the lever engages in matching manner, it is deflected by way of the further passages.

The seat anchoring element consists of plastics material. It can even be made from a plastics material blow-moulded part to which the parts are then fixed.

The individual forms of embodiment are indicated in the subclaims.

Figure 4:
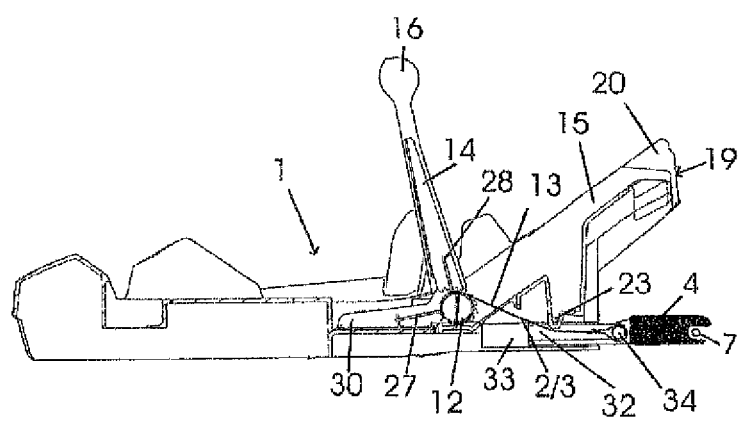

The invention is additionally explained in the following by way of the embodiment illustrated in the drawings, in which:

FIG. 1 shows a plan view of a seat anchoring element, which can be placed on a vehicle seat and is fastenable thereto, with two belts, which are led out rearwardly, with connectors, FIG. 2 shows the seat anchoring element, which is illustrated in FIG. 1, in a sectional illustration along the section A-A, FIG. 3 shows a perspective illustration of the seat anchoring element according to FIGS. 1 and 2 with a transverse belt and FIG. 4 shows a further embodiment of a seat anchoring element in a sectional illustration corresponding with FIG. 2, but with rods of a fixed ISOFIX connection.

A seat anchoring element 1 which is formed from plastics material and which is fastenable to a motor vehicle seat selectably by way of a transverse belt 6 or by way of belts 2 and 3 with connectors 4 and 5 fastened thereto is illustrated in the drawings. Child seats consisting of a seat part and a backrest part or alternatively also baby carriers, namely shell lying-down seats for small children, are placed on seat anchoring elements 1 of that kind and held secured thereto by locking means.

Such seat anchoring elements can also be connected with signalling devices such as known from DE 20 2009 001 975 U1. The seat anchoring element 1 has, for reception of such inserts, fastening elements 9 and 10 in which corresponding counter-elements at the insert engage. The insert is, in addition, laterally held in alignment by receiving walls 25 and holding protrusions 26, as well as by the elevated wall 19 at the rear side. The seat anchoring element 1 is supported by the rear side of the wall 19 against the backrest and by the underside on the surface of the vehicle seat. In order to achieve weight saving on the one hand and a high level of shape stability on the other hand, cut-outs 29 are additionally provided in regions which are not necessary for fixing of the insert. Further passages 21 and 22 are provided in the rear region, namely in the wall 19. These passages 21, 22 gain significance, as explained later, when the seat anchoring element 1 is to be secured to the vehicle seat by means of a transverse belt 6.

A U-shaped support 30 of a tensioning device is mounted on the base of the seat anchoring element 1 behind the centre of depth and centrally and symmetrically with respect to the longitudinal axis of the seat anchoring element 1. The tensioning device substantially consists of a ratchet drum 12 with ratchets 13, which are provided on both sides and which consist of sawtooth-shaped rim gears. Engaging as blocking means in the tooth gaps is a latch 27 fastened to the support 30. This latch 27 can be withdrawn from the ratchets 13 against the force of a spring. The tensioning belt 11, which is guided in the seat anchoring element 1 at the lower side around a deflection 23, can be wound up on the ratchet drum 12.

The two belts 2, 3, which are led out laterally through the passages 21 and further guides (not illustrated) in rearward direction, are fastened to this tensioning belt 11 so that on tightening of the tensioning belt lithe two belts 2 and 3 are automatically tightened therewith. Connectors 4, 5, at which the seat anchoring element 1 is fastenable to fixing elements 7, 8 at the vehicle seat, are located at the ends of these belts 2, 3. The fixing elements 7 and 8 are transverse pins, which are standardised ISOFIX anchors. A lever 14, which is pivotable relative to the ratchet drum 12 by mounting limbs 18 at both sides, is mounted on the same axis of the ratchet drum 12 to similarly be pivotable. An entrainer 28 is mounted in the lever 14 to be displaceable against the force of a spring, which entrainer slides over the tooth flanks of the teeth of the ratchet 13 during pivotation to the right and engages in the tooth gaps so that when the lever 14 is pivoted from the righthand position to the lefthand position the ratchet drum 12 can be rotated forwardly through a defined number of over-travelled teeth of the ratchet 13, in which case the tensioning belt 11 is reeled up. This has the consequence that due to the connection of the connectors 4, 5 with the fixing elements 7, 8 a shortening of the belts 2, 3 is provided so that the seat anchoring element 1 is fastened under tension on the vehicle seat, in which case the rear side of the wall 19 is pressed against the backrest of the vehicle.

If the seat anchoring element 1 is held secured by way of the ratchet drum 12 and the belts 2, 3 as well as the connectors 4, 5 then the lever 14 can be pivoted into the mounting recess 15 in the wall 19 and is at least partly sunk therein. The width of the recess 15 is somewhat larger than the width of the lever 14 so that clamping gaps arise on both sides. If the seat anchoring element 1 cannot or is not to be secured to the vehicle seat by way of the belts 2, 3, then it is possible, in the erected state of the lever 14, to insert a transverse belt 6 or, as illustrated in FIG. 3, to guide it through the passages 21 and 22, by which the seat anchoring element 1 is alternatively or additionally fastenable to the vehicle seat. The transverse belt 6 can be, for example, the lap belt section of a three-point belt. However, a separate transverse belt 6 with lock tongues mounted at the ends can also be provided, which lock tongues can be inserted into existing plug locks for the vehicle's own safety belt.

It is apparent from FIG. 3 that the lever 14 has a double function. On the one hand, for actuation of the tensioning device the lever is provided with the ratchet drum 12 and on the other hand, however, it also serves for clamping the transverse belt 6 in place and thus for tensioning the same. In order to ensure this tensioning after the fastening, it is further provided that the lever 14 can be fixed to the wall 19 by way of the handle 16—which is provided for the actuation—by means of a locking device (not illustrated in detail). Through pressing down, for example, a detent pin engages the handle 16 in a recess in a spring element 31 which can be pressed back. This spring element 31 can be pressed back rearwardly in order to achieve release of the pin again. However, it is also possible to, for example, allow a detent lug to engage in a detent recess, which is then pivoted by way of the laterally provided actuating element 17 at the handle 16 in order to release the connection.

The handle 16 is mounted recessed in the wall 19 in a mounting recess 20 provided there. The embodiment shows that the seat anchoring element can be fastened to a vehicle seat in two different modes and manners with one and the same construction. However, it is also possible to additionally provide the third fastening possibility of known kind by way of telescopic rods settable in length, at which connectors, which are connectible with the fixing elements 7 and 8, i.e. the ISOFIX anchors, are mounted at the rear side.

A longitudinal section through a seat anchoring element 1 according to FIG. 1 in correspondence with the section in FIG. 2 is illustrated in FIG. 4, which has all significant elements similarly illustrated in FIG. 2, so that reference can be made to the figure description of FIG. 2 with respect thereto. Thus, similarly illustrated are: The lever 14 with the handle 16 disposed thereon, the ratchet 13, the entrainer 28—which acts thereon—at the lever 14, and the latch 27 which co-operates therewith and which is mounted on the support 30 to be displaceable against a spring. In addition, the recess 15 for the lever 14 and the mounting recess 20 for the handle 16 are located in the inclined wall 19. Moreover, a deflection 23 is respectively provided on each side in order to act on the belt 2 or the belt 3 extending at the other side. Two ratchet drums can thus be arranged one behind the other, but the two belts 2 and 3 can also be led together and fixed to a tensioning belt (not illustrated). The lateral belts 2 and 3 are placed on pins 34 by an eye.

These pins 34 are mounted to each protrude at a respective rod 32, in the embodiment a profile rail. Disposed on each rod 32 at the rear side is a connector 4 which can be plugged onto a fixing element 7 at the vehicle seat or at the bodywork when the rod 32 is pushed rearwardly. The rod 32 is displaceably mounted in a mounting chamber 33. The individual mounting elements as well as mechanisms possibly acting on the rods 32 are, for the sake of simplicity, not indicated here. The two rods 32, which are arranged laterally, can obviously also be connected together by way of a bridge element, to which then a single tensioning belt is fastenable in order to be able to draw the rods 32 into the mounting chambers or draw them forwardly thereinto. As a result, after the connector 4 has been fixed to the fixing element 7 the seat is pressed by the wall 19 against the backrest of the vehicle seat as well as pressed onto the seat portion at the same time. The necessary pressure is exerted by actuation of the ratchet 13, in that the lever 16, as also described on the basis of the preceding figures, is actuated in order to wind up the belts 2 and 3 and by way of that to exert a tension on the seat anchoring element 1. In the tensioned state the lever 14 can be pivoted into the provided recess 15. The embodiment shows that the ratchet 13 used here can be used not only in conjunction with rigid rods for producing an ISOFIX connection, but also in conjunction with flexible belts which are fastenable to the fixing elements 7 and 8.

REFERENCE NUMERAL LIST 1 seat anchoring element
2 belt
3 belt
4 connector
5 connector
6 transverse belt
7 fixing element
8 fixing element
9 fastening element
10 fastening element
11 tensioning belt
12 ratchet drum
13 ratchet
14 lever
15 recess
16 handle
17 actuating element
18 mounting limb
19 wall
20 mounting recess
21 passage
22 passage
23 deflection
24 deflection
25 receiving wall
26 holding protrusions
27 latch
28 entrainer
29 cut-out
30 support
31 spring element
32 rod
33 mounting chamber
34 pin

The invention claimed is:

1. A seat anchoring element for child safety seats or baby carriers on a vehicle seat, which is fastenable to fixing elements in or at the vehicle seat or the vehicle bodywork behind the vehicle seat by connectors at ends of a belt system comprising laterally and/or rearwardly accessible first and second belts or at ends of a transverse belt or at ends of rearwardly protruding rods connected to the first and second belts and mounted to be displaceable laterally with respect to a central longitudinal axis of the seat anchoring element, which seat anchoring element has at an upper side at least one front fastening element and at least one rear fastening element for fixing the child safety seat or the baby carrier thereto and at least one tensioning device for the child safety seat or the baby carrier, ends of which being configured for connection to the connectors, wherein the first and second belts of the belt system or the first and second belts connected with the rods or a common tensioning belt connected with the first and second belts can be wound up on a ratchet drum at the tensioning device and after unlocking of a blocking device of the ratchet drum can be at least partly unwound, which ratchet drum is rotatably mounted in the seat anchoring element, and a lever, which is pivotably mounted in the seat anchoring element and which is pivotable into a recess in the seat anchoring element from an upright ratchet actuating setting for tensioning the first and second belts or the common tensioning belt to a recessed rest setting, is coupled with the ratchet drum, wherein at least the axis of the pivot of the lever extends transversely to the longitudinal axis of the seat anchoring element.

2. The seat anchoring element according to claim 1, wherein the first and second belts or the first and second belts connected with the rods are fastened in common to a tensioning belt or a tensioning belt is fastened to a bridge part connecting the rods and wherein the tensioning belt is so guided through a central deflection that a winding end can be wound up on and unwound from the ratchet drum.

3. The seat anchoring element according to claim 1, wherein the seat anchoring element comprises plastics material.

4. The seat anchoring element according to claim 1, wherein the lever is the same width as or wider than the width of the ratchet drum and is pivotable into a contour-matched U-shaped recess to be locked.

5. The seat anchoring element according to claim 4, wherein the transverse belt extends under the lever, only when the lever is in a rest setting, transversely through the U-shaped recess.

6. The seat anchoring element according to claim 4, wherein the lever has two lateral mounting limbs which engage over the ratchet drum and which are pivotably mounted on an axle of the ratchet drum.

7. The seat anchoring element according to claim 4, wherein the lever is held in a recessed position in the U-shaped recess by a locking device.

8. The seat anchoring element according to claim 7, wherein the locking device comprises a latch, a detent lug or a locking pin, which is mounted at one of the lever or a wall of the U-shaped recess and with which a corresponding counter-element at the other of the lever or wall of the U-shaped recess co-operates, and wherein at least one actuating element for an unlocking mechanism, on actuation of which the locking device releases the lever to permit the lever to pivot, is provided at the lever or wall of the U-shaped recess.

9. The seat anchoring element according to claim 4, wherein a lap belt of a vehicle belt or a lap belt section of a three-point vehicle belt by itself or together with a shoulder belt section or the transverse belt is insertable in transverse direction to extend over the U-shaped recess, wherein free belt ends of the vehicle belt or the three-point vehicle belt or the transverse belt are each connectible by way of a lock tongue with a lock at the vehicle seat or therewith by way of connecting elements.

10. The seat anchoring element according to claim 9, wherein the lever has a handle at a lever upper side.

11. The seat anchoring element according to claim 10, wherein two laterally projecting actuating elements are mounted in the handle to be displaceable against a force of a spring arrangement and when operated simultaneously release the locking device.

12. The seat anchoring element according to claim 10, wherein the seat anchoring element has at a rear side an elevated wall adapted to be supported at a backrest of the vehicle seat.

13. The seat anchoring element according to claim 12, wherein the first and second belts are so guided through passages and deflections formed in the elevated wall of the seat anchoring element that on connecting the connectors with the fixing elements and on tensioning the first and second belts or the common tensioning belt the seat anchoring element is configured to rest under tension on the vehicle seat with simultaneous pressure against the backrest of the vehicle seat.

14. The seat anchoring element according to claim 12, wherein the elevated wall extends at an inclination from below to above in a depth of a seat cushion element and wherein the U-shaped recess for reception of the lever is formed in the seat cushion element.

15. The seat anchoring element according to claim 12, wherein lateral passages through which the transverse belt or the lap belt section is led are provided parallel to a central wall section of the elevated wall of the seat anchoring element to which the lever is fastened and mounted.

16. The seat anchoring element according to claim 12, wherein a mounting recess for receiving the handle of the lever is provided in an upper section of the elevated wall.

* * * * *